(12) United States Patent
Tsai (10) Patent No.: US 11,334,186 B1
(45) Date of Patent: May 17, 2022

(54) TOUCH CONTROL DEVICE AND MANUFACTURING METHOD THEREOF

(71) Applicants: INTERFACE TECHNOLOGY (CHENGDU) CO., LTD., Chengdu (CN); INTERFACE OPTOELECTRONICS (SHENZHEN) CO., LTD., Shenzhen (CN); INTERFACE OPTOELECTRONICS (WUXI) CO., LTD., Wu Xi (CN); GENERAL INTERFACE SOLUTION LIMITED, Miaoli County (TW)

(72) Inventor: Han Lung Tsai, Shenzhen (CN)

(73) Assignees: Interface Technology (Chengdu) Co., Ltd., Chungdu (CN); Interface Optoelectronics (Shenzhen) Co.. Ltd., Guangdong (CN); Interface Optoelectronics (Wuxi) Co., Ltd., Wuxi (CN); General Interface Solution Limited, Miaoli County (TW)

(*) Notice: Subject to any disclaimer, the term of this patent is extended or adjusted under 35 U.S.C. 154(b) by 0 days.

(21) Appl. No.: 17/199,767

(22) Filed: Mar. 12, 2021

(30) Foreign Application Priority Data

Feb. 2, 2021 (CN) .......................... 202110141839.7

(51) Int. Cl.
| | | |
|---|---|---|
| *G06F 3/041* | (2006.01) | |
| *G06F 3/042* | (2006.01) | |
| *B29B 11/06* | (2006.01) | |
| *B29C 45/14* | (2006.01) | |
| *B29L 31/34* | (2006.01) | |
| *B29K 669/00* | (2006.01) | |
| *B29K 633/04* | (2006.01) | |

(52) U.S. Cl.
CPC .......... *G06F 3/04164* (2019.05); *B29B 11/06* (2013.01); *B29C 45/14* (2013.01); *G06F 3/042* (2013.01); *B29K 2633/12* (2013.01); *B29K 2669/00* (2013.01); *B29L 2031/3475* (2013.01); *G06F 2203/04103* (2013.01)

(58) Field of Classification Search
CPC ................. G06F 3/04164; G06F 3/042; G06F 2203/04103; B29B 11/06; B29C 45/14; B29K 2633/12; B29K 2669/00; B29L 2031/3475
See application file for complete search history.

(56) References Cited

U.S. PATENT DOCUMENTS

| | | | |
|---|---|---|---|
| 2012/0032916 A1* | 2/2012 | Enoki ..................... | G06F 3/044 29/829 |
| 2015/0160759 A1* | 6/2015 | Lien ..................... | G06F 3/0443 345/174 |
| 2020/0310596 A1* | 10/2020 | Glad ..................... | G06F 3/0445 |

* cited by examiner

*Primary Examiner* — Afroza Chowdhury
(74) *Attorney, Agent, or Firm* — Rosenberg, Klein & Lee (57) ABSTRACT

A touch device comprises a housing, a touch sensor and a circuit board. The housing has an inner space and an opening. The touch sensor is arranged in the inner space, and comprises a substrate, first metal pads and a sensing layer. The substrate is arranged in the inner space and corresponding to the shape of the housing. The sensing layer is arranged on the substrate and electrically connected to the first metal pads. The circuit board is arranged on the housing at a position adjacent to the opening, and comprises second metal pads facing towards the inner space and electrically connected to the first metal pads, respectively. The provided touch device can achieve full-screen touch control without the need for reserving a bezel to lay out wires.

26 Claims, 14 Drawing Sheets

TOUCH CONTROL DEVICE AND MANUFACTURING METHOD THEREOF

This application claims priority of Application No. 202110141839.7 filed in Mainland China (P.R.C.) on 2 Feb. 2021 under 35 U.S.C. § 119; the entire contents of all of which are hereby incorporated by reference.

BACKGROUND OF THE INVENTION

Field of the Invention

The present invention relates to a touch device, and more particularly, to a bezel-less stereoscopic touch device and a manufacturing method thereof.

Description of the Prior Art

In recent years, touch devices are widely applied in various electronic devices, such as smart phones, digital cameras, tablets and other mobile electronic devices. Compared with traditional physical keys, touch devices are more convenient to use, and users can conveniently slide their fingers on the touch devices to input various operation commands.

Figure 1:
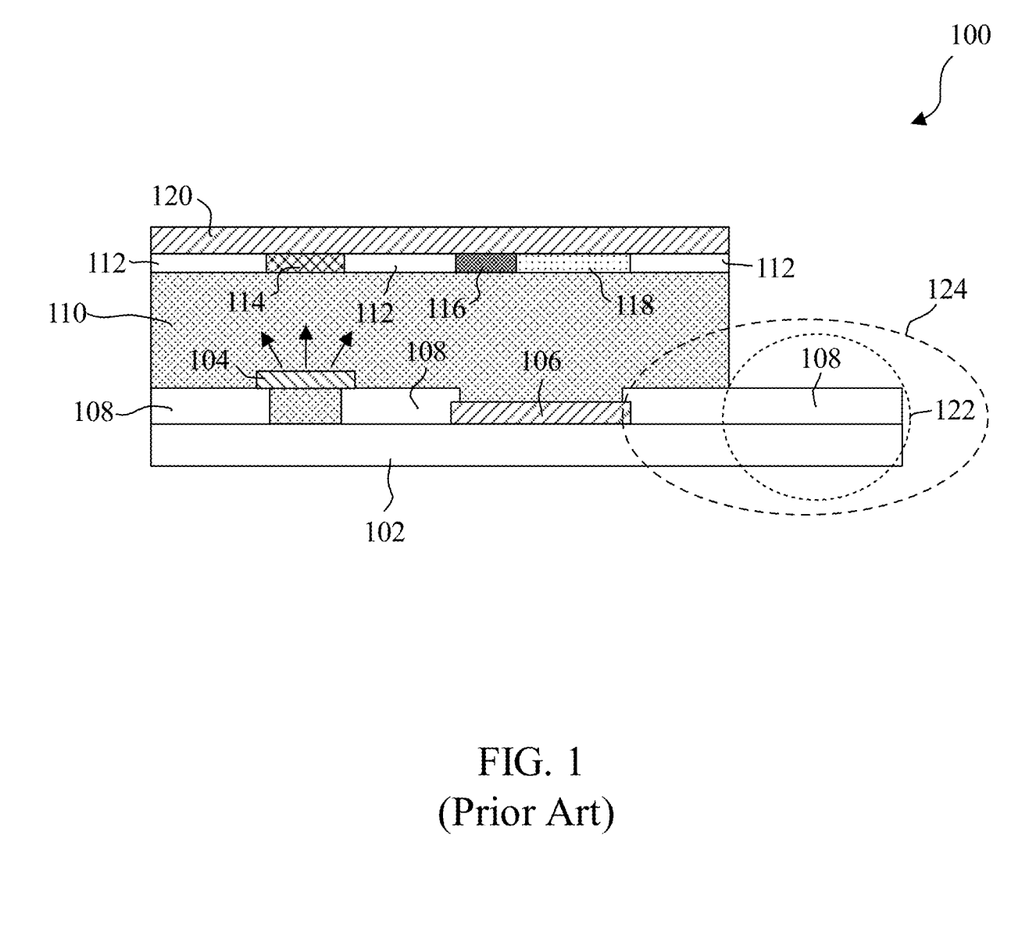
FIG. 1 is a diagram illustrating a first exemplification of conventional touch device.

FIG. 1 is a diagram illustrating a first exemplification of conventional touch device 100. In the touch device 100, the light emitting diode 104 and the touch sensor 106 are arranged on a substrate 102 and electrically connected to a circuit board (not shown in the figure) via wires 108. The plastic resin 110 covers the light emitting diode 104 and the touch sensor 106. The plastic resin 110 comprises a pattern layer which includes a shading area 112, a light leakage area 114, and pattern areas 116 and 118. The shading area 112 shades the light from the light emitting diode 104, the light leakage area 114 allows the light from the light emitting diode 104 to pass through, and the pattern areas 116 and 118 can be set with patterns (e.g., patterns of numbers). The touch device 100 can display a pattern by the light emitting diode 104 and the pattern layer. The protective layer 120 covers the pattern layer. The touch device 100 has a tail 122 to connect to the circuit board. However, the tail 122 of the touch device 100 is prone to brittle cracking after a high temperature process. In addition, the touch device 100 needs to reserve a bezel for a wire routing area 124, which makes it impossible for the touch device 100 to achieve full-screen touch control.

Figure 2:
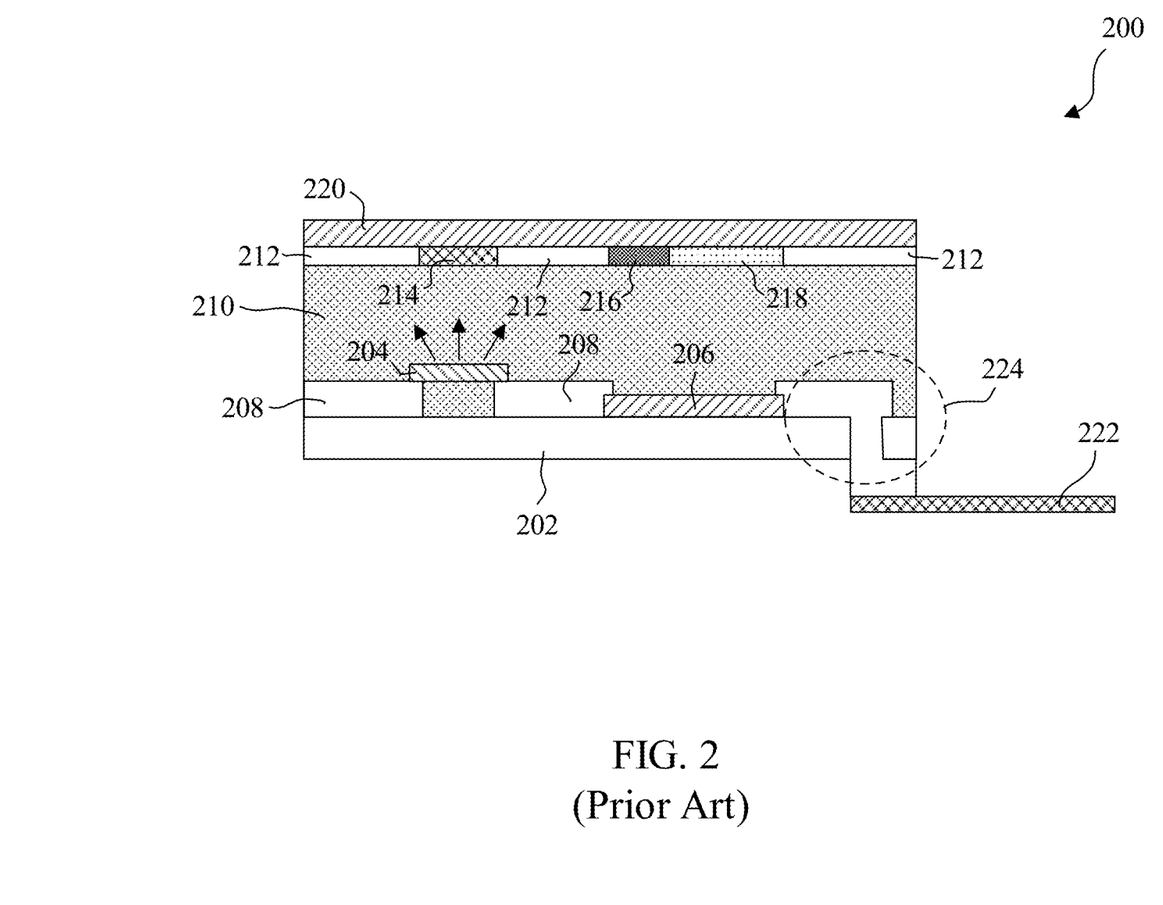
FIG. 2 is a diagram illustrating a second exemplification of conventional touch device.

FIG. 2 is a diagram illustrating a second exemplification of conventional touch device 200. The touch device 200 comprises a substrate 202, a light-emitting diode 204, a touch sensor 206, a plastic resin 210, a pattern layer, and a protective layer 220. The light-emitting diode 204 and touch sensor 206 are disposed on the substrate 202 and are electrically connected to the circuit board 222 via the wires 208. The plastic resin 210 covers light-emitting diode 204 and touch sensor 206. The pattern layer comprises a shading area 212, a light leakage area 214, and pattern areas 216 and 218. The shading area 212 may shade the light from the LED 204, the light leakage area 214 allows light from the LED 204 to pass through, and the pattern areas 216 and 218 can be set with patterns (e.g., patterns of numbers). The touch device 200 can display a pattern by the light emitting diode 204 and the pattern layer. The protective layer 220 covers the pattern layer. The wires 208 of the touch device 200 may be connected to the circuit board 222 via a through-hole. However, if the touch device 200 first performs a wire bonding process to connect the wires 208 to the circuit board 222 and then performs a molding process, it is highly possible that the circuit board 222 may peel off. If the touch device 200 performs the molding process and then performs the wire bonding process, the shape of the molded form would limit the wiring manner. In addition, since the touch device 200 also needs to reserve a bezel for the wire routing area 224, in this way it is impossible for the touch device 200 to achieve full-screen touch control.

Figure 3:
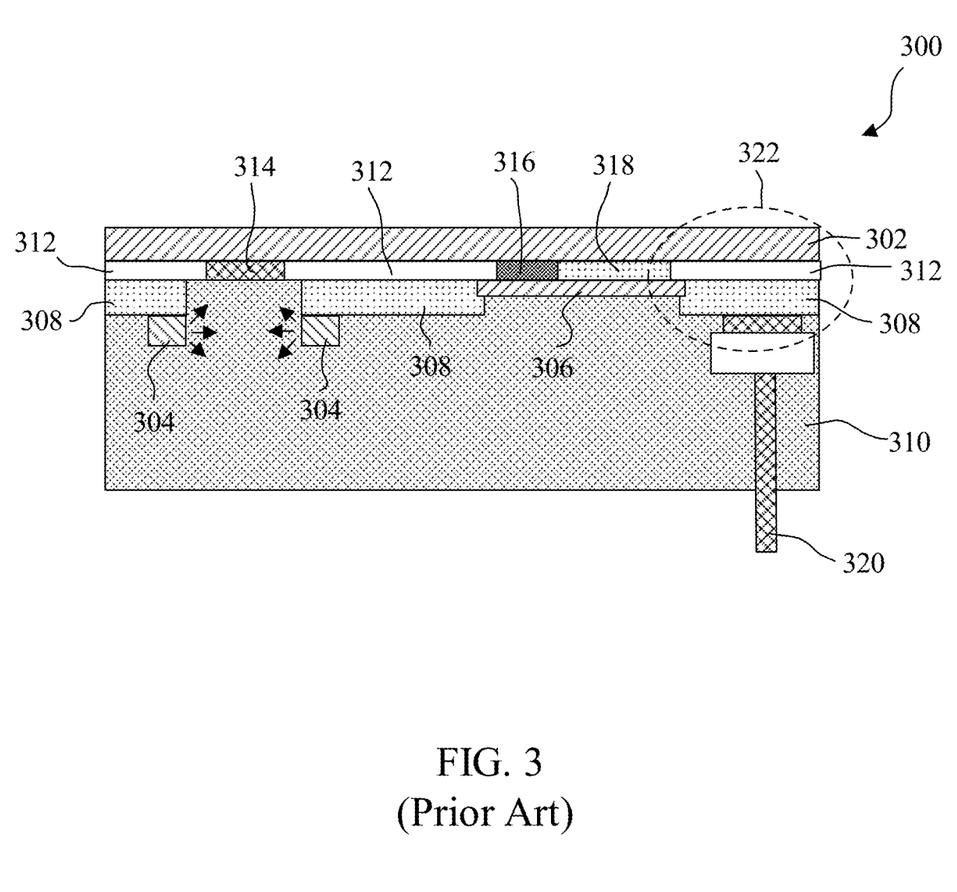
FIG. 3 is a diagram illustrating a third exemplification of conventional touch device.

FIG. 3 is a diagram illustrating a third exemplification of conventional touch device 300. In the touch device 300, a pattern layer is arranged under the substrate 302, and the pattern layer comprises a shading area 312, a light leakage area 314, and pattern areas 316 and 318. The shading area 312 shades the light from the light emitting diode 304, the light leakage area 314 allows the light from the light emitting diode 304 to pass through, and the pattern areas 316 and 318 can be set with patterns (e.g. patterns of number). The light emitting diode 304 and the touch sensor 306 are arranged below the pattern layer and are electrically connected to a circuit board (not shown in the figure) through the wire 308 and the pin header 320. The plastic resin 310 covers the light emitting diode 304 and the touch sensor 306, and the substrate 302 serves as a protective layer for the touch device 300. The touch device 300 can display a pattern by the light emitting diode 304 and the pattern layer. However, if the touch device 300 is molded after the pin header 320 is fixed, the mold needs to avoid the pin 320 to prevent the mold from offsetting and thereby pressing the pin header 320, resulting in deformation of the pin header 320 or the glue overflow problem. On the contrary, if the pin header 320 is fixed after the molding process, it is necessary to avoid the pin-pad area during the molding process and then fix the pin header 320 with conductive adhesive and epoxy resin. hence, it is more difficult to subsequent processing and rework the defective products. In addition, the touch device 300 also needs to reserve the bezel for the wire routing area 322, making the touch device 300 unable to achieve full-screen touch control.

Figure 4:
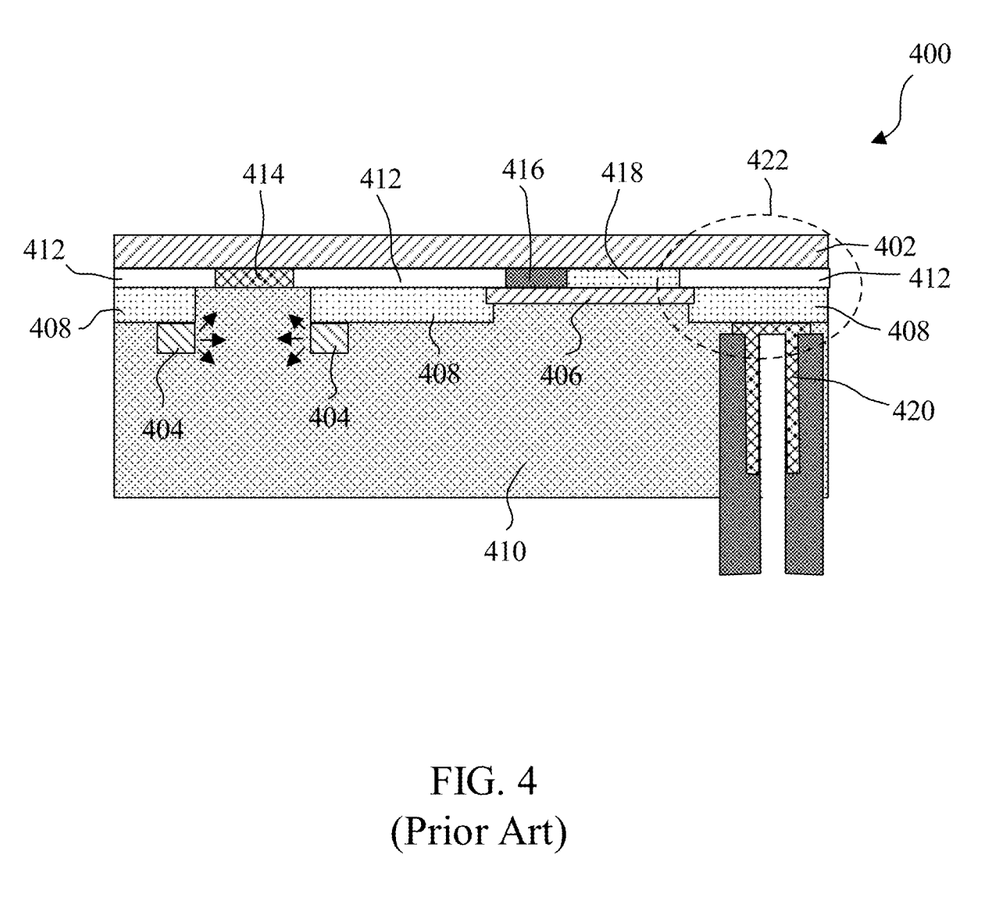
FIG. 4 is a diagram illustrating a fourth exemplification of conventional touch device.

FIG. 4 is a diagram illustrating a fourth exemplification of conventional touch device 400. The touch device 400 comprises a substrate 402, a light emitting diode 404, a touch sensor 406, a plastic resin 410, and a pattern layer. The substrate 402 serves as a protective layer of the touch device 400. The pattern layer is arranged under the substrate 402 and comprises a shading area 412, a light leakage area 414, and pattern areas 416 and 418. The shading area 412 shades the light from the LED 404, the light leakage area 414 allows the light from the LED to pass through, and the pattern areas 416 and 418 can be set with patterns (e.g., patterns of numbers). The light emitting diode 404 and the touch sensor 406 are located below the pattern layer and are electrically connected to a circuit board (not shown in the figure) via the wires 408 and female header 420. The plastic resin 410 covers the light emitting diode 404 and the touch sensor 406, and the touch device 400 can display a pattern by the light emitting diode 404 and the pattern layer. However, if the touch device 400 is molded after the female header 420 is fixed, the mold needs to avoid the female header 420 to prevent the mold from offsetting and pressing the female header 420, resulting in deformation of the female header 420 or glue overflow problem. On the contrary, if the touch device 400 is molded first and then fixes the female header 420, it needs to avoid the female header pad area during the molding process, and then fixes the female header 420 with conductive adhesive and epoxy resin. As a result, it would be more difficult to subsequent processing and rework the defective products. In addition, the touch device 400 also needs to reserve a bezel for the wire routing area 422, making the touch device 400 unable to achieve the full-screen touch control.

The conventional touch devices 100, 200, 300 and 400 need to reserve bezels to design the wire routing area, and thus cannot achieve full-screen touch control. In addition, the conventional touch devices 100, 200, 300 and 400 also encounter structural and processing problems regarding the electrical connection of in-mold electronic components.

SUMMARY OF THE INVENTION

The objective of the present invention is to propose a touch device and a manufacturing method thereof.

The present invention provides a touch device. The touch device comprises a housing, a touch sensor and a circuit board. The housing has at least one sidewall, an inner space and an opening, wherein the at least one sidewall defines the inner space and the opening is connected to the inner space. The touch sensor is arranged in the inner space, and includes a substrate, a plurality of first metal pads, a sensing layer. The substrate is arranged on the at least one sidewall and corresponding to the shape of the housing. The plurality of first metal pads are arranged on the substrate. The sensing layer is arranged on the substrate and electrically connected to the plurality of first metal pads. The circuit board is arranged on the housing at a position adjacent to the opening, wherein the circuit board has a plurality of second metal pads facing towards the inner space and electrically connected to the plurality of first metal pads, respectively.

According to an embodiment of the present invention, the touch device further comprises a connector that connect the first metal pad and the second metal pad.

According to an embodiment of the present invention, the connector comprises a plurality of conductive silicone strips and a plurality of insulating silicone strips, and the plurality of conductive silicone strips are arranged interspersed with the plurality of insulating silicone strips.

According to an embodiment of the present invention, said each first metal pad or said each second metal pad is connected to at least three of the conductive silicone strips.

According to an embodiment of the present invention, the touch device further comprises a retaining frame that fixes the connector to the inner side of the housing, wherein the connector is clamped between the retaining frame and the housing.

According to an embodiment of the present invention, the touch device further comprises a display that is arranged on the retaining frame or embedded in a slot of the retaining frame.

According to an embodiment of the present invention, the touch device further comprises a lower cover that is connected to the housing and covering the opening, wherein the circuit board is fixed to the lower cover.

According to an embodiment of the present invention, the sensing layer comprises a transparent conductive film which comprises a plurality of transparent conductive wires connected to the plurality of first metal pads.

According to an embodiment of the present invention, the plurality of transparent wires are made of poly3,4-ethylene-dioxythiophene or cubic boron nitride.

According to an embodiment of the present invention, the sensing layer comprises a first transparent conductive film, a second transparent conductive film and an insulating layer. The first transparent conductive film has a plurality of first transparent conductive wires connected to a portion of the plurality of first metal pads. The second transparent conductive film has a plurality of second transparent conductive wires connected to the remaining portions of the plurality of first metal pads. The insulating layer is between the first transparent conductive film and the second transparent conductive film.

According to an embodiment of the present invention, the plurality of first transparent wires and the plurality of second transparent wires are made of poly3,4-ethylenedioxythiophene or cubic boron nitride.

According to an embodiment of the present invention, the insulating layer is an optical adhesive.

According to an embodiment of the present invention, the substrate is made of polycarbonate or polymethyl methacrylate.

The present invention provides a method for manufacturing a touch device, which comprises forming a plurality of first metal pads and a sensing layer on a substrate to produce a touch sensor, wherein the sensing layer is connected to the plurality of first metal pads; placing the touch sensor into a mold for thermoforming, in order to produce a three-dimensional (3D) touch sensor, wherein the plurality of first metal pads are located on the inner side of the three-dimensional touch sensor; and forming a three-dimensional housing on the outer side of the three-dimensional touch sensor by injection molding; and electrically connected to a plurality of second metal pads of a circuit board to the plurality of first metal pads, respectively.

According to an embodiment of the present invention, the step of electrically connected to the plurality of second metal pads to the plurality of first metal pads respectively comprises using a connector to connect the first metal pad and the second metal pad.

According to an embodiment of the present invention, the connector comprises a plurality of conductive silicone strips and a plurality of insulating silicone strips, and the plurality of conductive silicone strips are arranged interspersed with the plurality of insulating silicone strips.

According to an embodiment of the present invention, the method further comprises arranging said each first metal pad or said each second metal pad to connect to at least three of the conductive silicone strips.

According to an embodiment of the present invention, the method further comprises using a retaining frame to fix the connector to the inner side of the three-dimensional touch sensor, wherein the connector is connected to the plurality of first metal pads.

According to an embodiment of the present invention, the method further comprises arranging a display on the retaining frame or embedding the display in a slot of the retaining frame.

According to an embodiment of the present invention, the method further comprises combining a cover and the housing together.

According to an embodiment of the present invention, the step of forming the sensing layer comprises forming a transparent conductive film which has a plurality of transparent conductive wires connected to the plurality of first metal pads.

According to an embodiment of the present invention, the method further comprises forming the plurality of transparent conductive wires by using poly3,4-ethylenedioxythiophene or cubic boron nitride.

According to an embodiment of the present invention, the step of forming the sensing layer comprises forming a first transparent conductive film, wherein the first transparent conductive film has a plurality of first transparent conductive wires connected to a portion of the plurality of first metal pads; forming an insulating layer on the first transparent conductive film; and forming a second transparent conductive film on the insulating layer, wherein the second transparent conductive film has a plurality of second transparent conductive wires connected to the remaining portions of the plurality of first metal pads, and the insulating layer is between the first transparent conductive film and the second transparent conductive film.

According to an embodiment of the present invention, the method further comprises forming the plurality of first transparent conductive wires and the plurality of second transparent conductive wires by using poly3,4-ethylenedioxythiophene or cubic boron nitride.

According to an embodiment of the present invention, the step of forming the insulating layer comprises forming the insulating layer by using an optical adhesive.

According to an embodiment of the present invention, the method further comprises forming the substrate by using polycarbonate or polymethyl methacrylate.

The touch device of the present invention can achieve full-screen touch control without the need for reserving a bezel to lay out wires.

DETAILED DESCRIPTION OF THE INVENTION

In order to make the disclosure of the present invention more detailed and complete, the following illustrative descriptions are given with respect to the embodiments and specific examples of the present invention. However, this is not the only form in which the present invention should be implemented or put in practice.

The following nomenclature is intended to describe specific embodiments only and is not intended to limit the invention. For example, the singular forms "one", "a" and "the" are also intended to cover the plural forms, unless the context clearly indicates otherwise. It should also be understood that when the terms "comprise", "include" are used in the specification, the presence of described feature, entirety, step, operation, component and/or part is indicated, but the presence of one or more other features, entireties, steps, operations, components and/or parts are not excluded.

Embodiments of the present invention described below in section views and three-dimensional views are merely idealized embodiments of the invention. Therefore, differences in the shape from what is illustrated due to manufacturing processes and/or tolerances are to be expected. Hence, the embodiments of the invention should therefore not be interpreted as being limited to particular shapes of areas as illustrated in the drawings, but should also include deviations in shape resulting from manufacturing. The shapes of areas shown in the drawings are merely for illustrative purposes, rather than limitations of the scope of the present invention.

Figure 5:
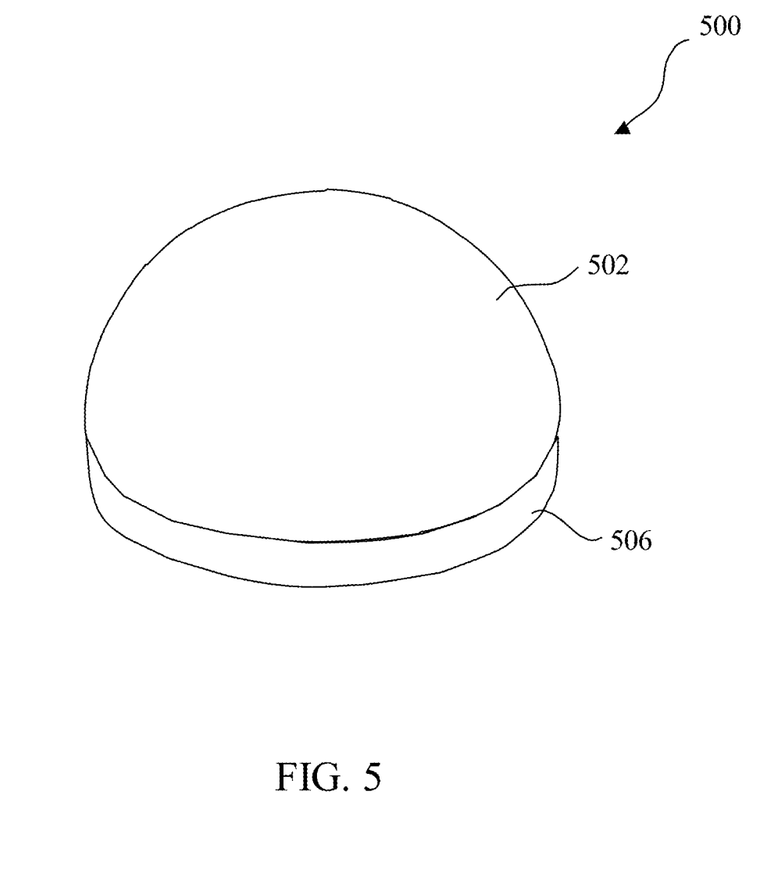
FIG. 5 is a diagram illustrating a three-dimensional view of the touch device according to the present invention.
Figure 6:
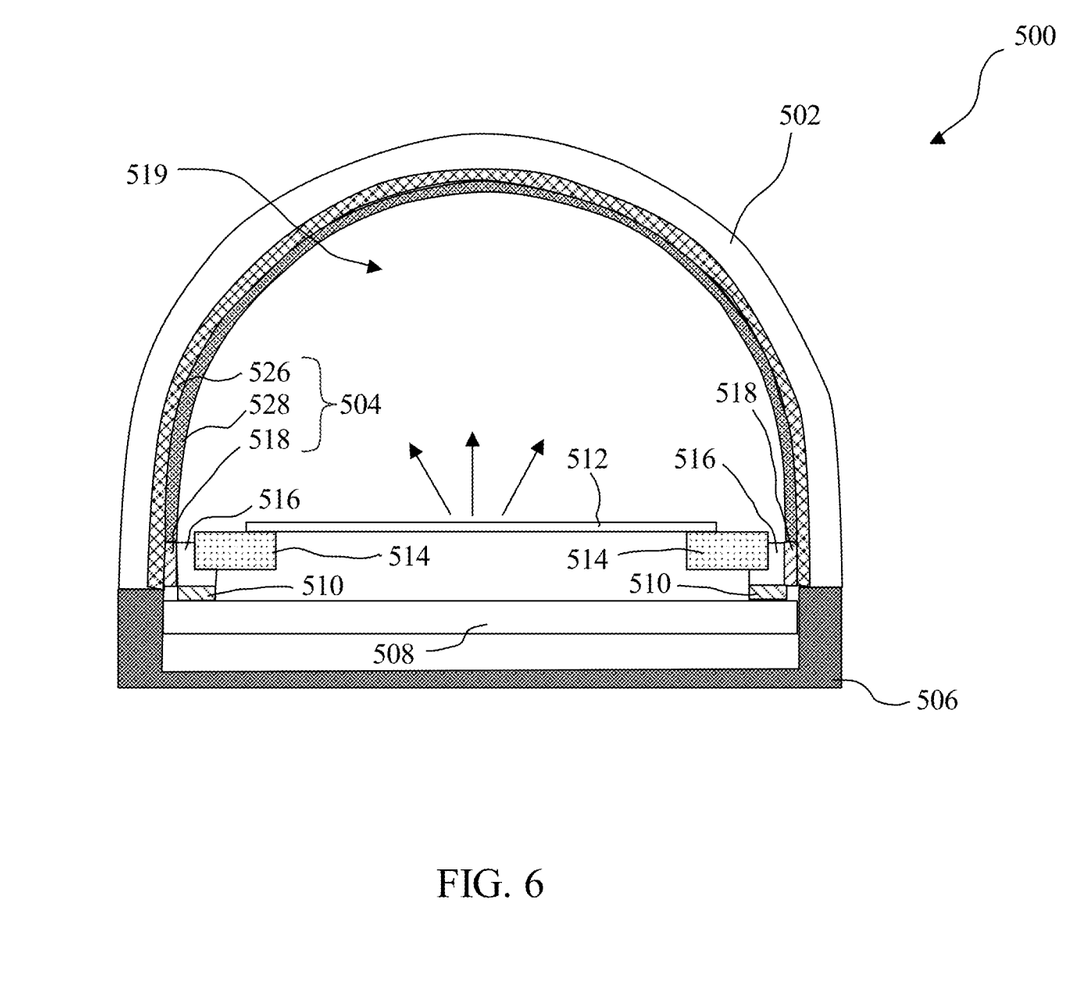
FIG. 6 is a diagram illustrating a cross-sectional view of the touch device according to the present invention.
Figure 7:
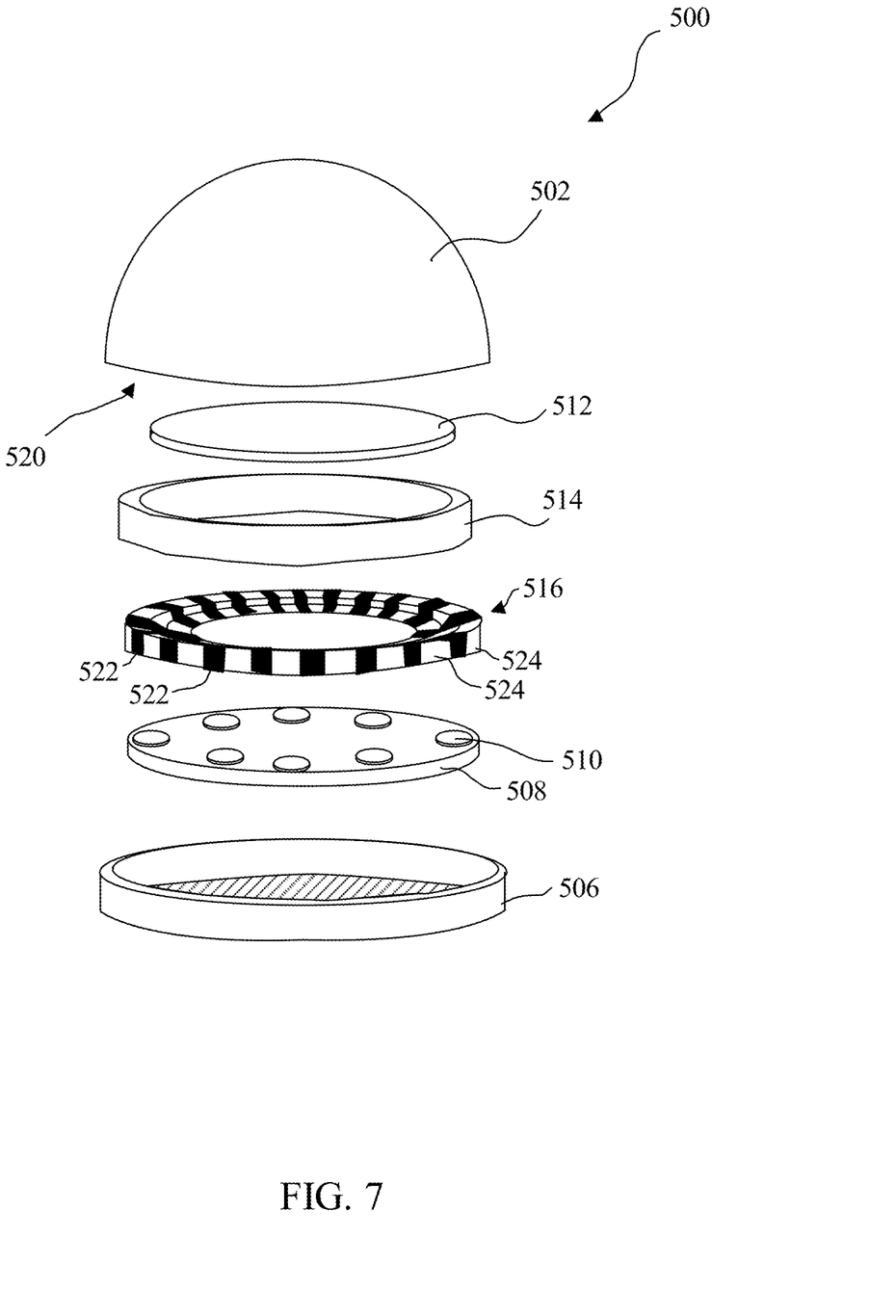
FIG. 7 is an exploded-view diagram illustrating the touch device of the present invention.

FIG. 5 is a diagram illustrating a three-dimensional view of the touch device according to the present invention. FIG. 6 is a diagram illustrating a cross-sectional view of the touch device according to the present invention. FIG. 7 is an exploded-view diagram illustrating the touch device of the present invention. Referring to FIG. 5, FIG. 6 and FIG. 7, the touch device 500 comprises a housing 502, a touch sensor 504, a lower cover 506, a circuit board 508, a display 512, a retaining frame 514 and a connector 516. The housing 502 comprises a sidewall which defines a inner space 519. There is an opening 520 on the bottom of the housing 502, and the opening 520 is connected to the inner space 519. In the embodiments of FIG. 5 to FIG. 7, the housing 502 is a semi-spherical three-dimensional housing with a spherical surface. In other embodiments, the housing 502 may be a three-dimensional housing with a non-spherical surface, or the housing 502 may be a polygonal three-dimensional housing with more than two sidewalls, such as a cuboid. The touch sensor 504 is on the sidewall of the housing 502. The touch sensor 504 comprises a plurality of metal pads 518, a substrate 526 and a sensing layer 528. The lower cover 506 may be combined to the housing 502 and cover the opening 520. The circuit board 508 is disposed near the opening, e.g., the circuit board 508 may be arranged at the bottom of the housing 502, and may fully or partially cover the opening 520. The circuit board 508 is fixed to the lower cover 506 or attached to the connector 516. The circuit board 508 comprises a plurality of metal pads 510 facing towards the inner space 519. The connector 516 connects the metal pad 518 of the touch sensor 504 to the metal pad 510 of the circuit board 508, so that the metal pad 510 is electrically connected to the metal pad 518. The retaining frame 514 fixes the connector 516 on the inner wall of the housing 502. The display 512 is arranged on the retaining frame 514, and can emit light to make the three-dimensional touch device 500 illuminate or display a predetermined pattern on the housing 502. In order to make the display 512 display a pattern, at least a portion of the housing 502 and the touch sensor 504 may be light-transmissive. The touch device 500 of the present invention is of a three-dimensional mechanism, and the electrical connection area (wire routing area) of the touch sensor 514 and the circuit board 510 is inside the mechanism, thus the touch device 500 of the present invention can achieve full-screen touch control without reserving a bezel, and can also solve the structural and processing problems regarding the electrical connection of in-mold electronic components. In FIG. 6, the shapes of the housing 502 and the touch sensor 504 are hemispherical, but the invention is not limited thereto. The shapes of the housing 502 and the touch sensor 504 can also be in other regular or irregular shapes.

In one embodiment, the lower cover 506, the display 512 and the retaining frame 514 may also be omitted.

Figure 8:
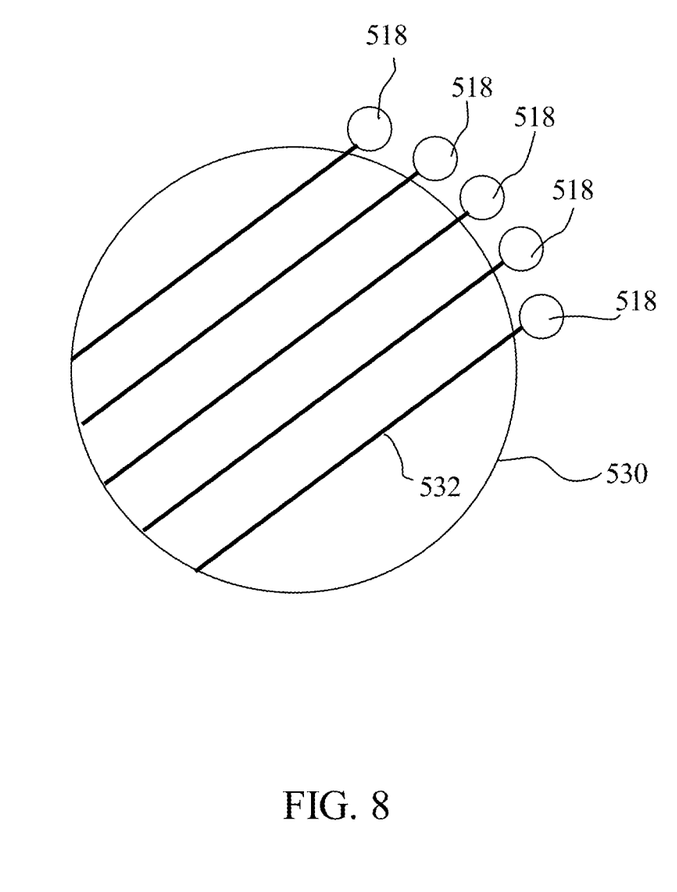
FIG. 8 is a diagram illustrating the sensing layer in FIG. 6 according to a first embodiment of the present invention.
Figure 9:
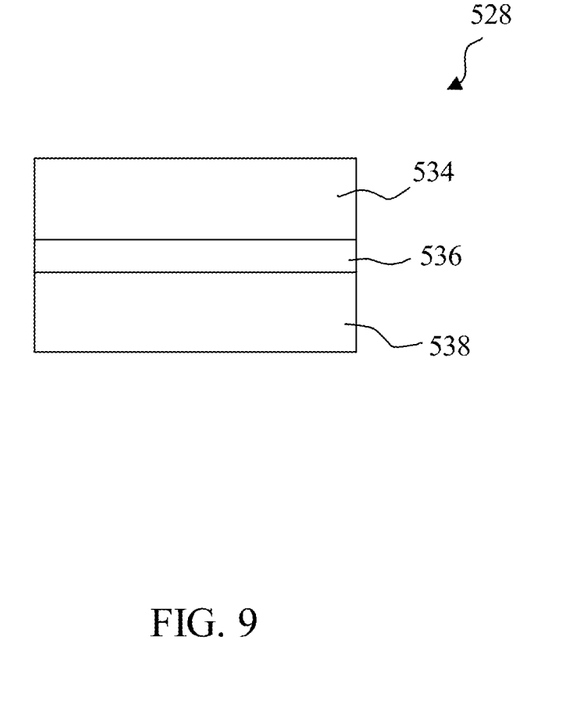
FIG. 9 is a diagram illustrating the sensing layer in FIG. 6 according to a second embodiment of the present invention.
Figure 10:
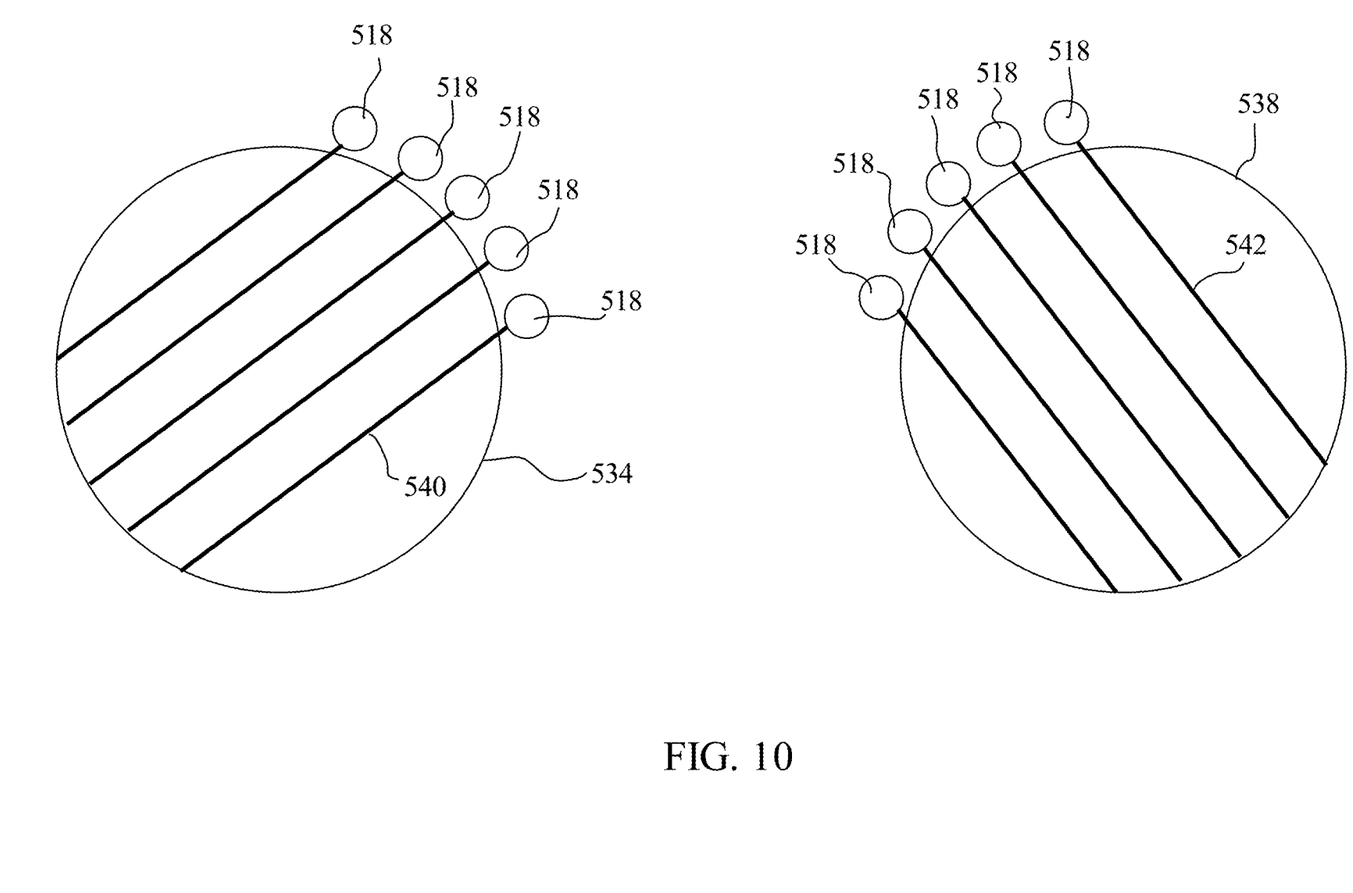
FIG. 10 is an upper-view diagram illustrating the two transparent conductive films in FIG. 9.

As shown in FIG. 6, the touch sensor 504 comprises a plurality of metal pads 518, a substrate 526 and a sensing layer 528. The substrate 526 is arranged on the sidewall of the housing 502 and is corresponding to the shape of the housing 502. The metal pads 518 and the sensing layer 528 are arranged on the substrate 526, and the sensing layer 528 is connected to the metal pads 518. The sensing layer 528 is for sensing the positions of objects. The sensing layer 528 at least partially covers the substrate 526, and the portion of the sensing layer 528 covering the substrate 526 corresponds to the shape of the substrate 526. The material of the substrate 526 may be polycarbonate or polymethyl methacrylate. FIG. 8 is a diagram illustrating the sensing layer 528 in FIG. 6 according to a first embodiment of the present invention. The sensing layer 528 in FIG. 8 comprises a transparent conductive film 530, and the transparent conductive film 530 has a plurality of transparent conductive wires 532 connected to the metal pads 518. FIG. 9 is a diagram illustrating the sensing layer 528 in FIG. 6 according to a second embodiment of the present invention. The sensing layer 528 in FIG. 9 comprises two transparent conductive films 534 and 538, and the two transparent conductive films 534 and 538 are separated by an insulating layer 536. In an embodiment, the insulating layer 536 may be an optical adhesive. FIG. 10 is an upper-view diagram illustrating the two transparent conductive films 534 and 538 in FIG. 9. The transparent conductive film 534 has a plurality of transparent conductive wires 540 connected to a portion of the metal pads 518. The transparent conductive film 538 has a plurality of transparent conductive wires 542 connected to the remaining of the metal pads 518. In FIG. 8 and FIG. 10, the material of the transparent conductive wires 532, 538 and 540 may be poly3,4-ethylenedioxythiophene or cubic boron nitride.

Figure 11:
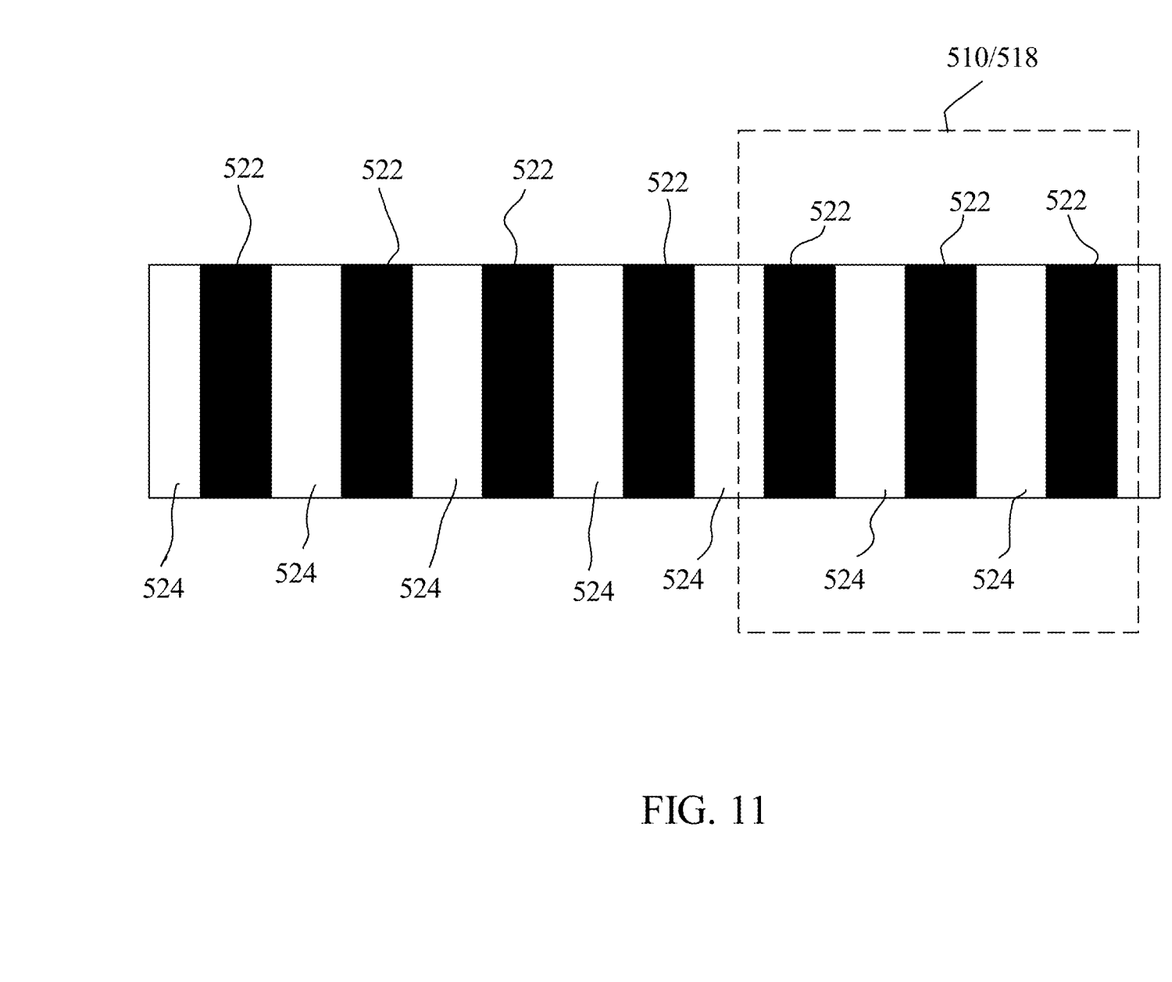
FIG. 11 is a diagram illustrating a partial enlargement of the connector in FIG. 7.

In the embodiment of FIG. 7, the connector 516 is a zebra connector that comprises a plurality of conductive silicone strips 522 and a plurality of insulating silicone strips 524. As shown in FIG. 11, the conductive silicone strips 522 and the insulating silicone strips 524 are arranged in an interleaved manner. Since the connector 516 in FIG. 11 is composed of conductive silicone strips 522 and insulating silicone strips 524, it may also be referred to as a silicone connector. In the embodiments of FIG. 6 and FIG. 7, the connector 516 is L-shaped, but the invention is not limited thereto. The connector 516 may also be in other regular or irregular shapes.

Figure 12:
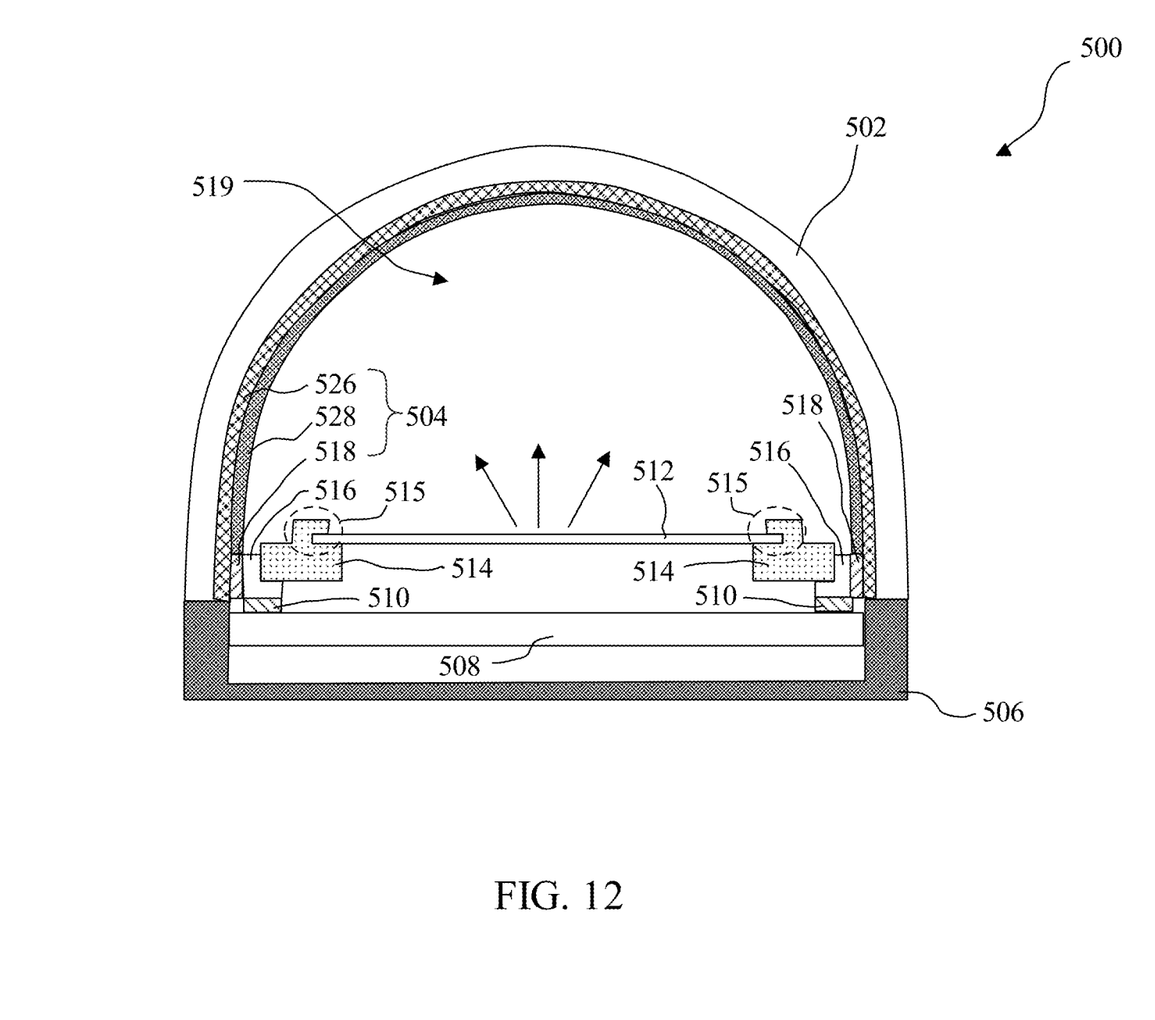
FIG. 12 is a diagram illustrating an embodiment of a retaining frame.

In the embodiment of FIG. 6, the display 512 may be attached to the retaining frame 514 by an adhesive or fixed to the retaining frame 514 by other elements, such as screws. FIG. 12 is a diagram illustrating another embodiment of a retaining frame. In FIG. 12, the retaining frame 514 has a slot 515, and the display 512 is embedded in the slot 515.

Figure 13:
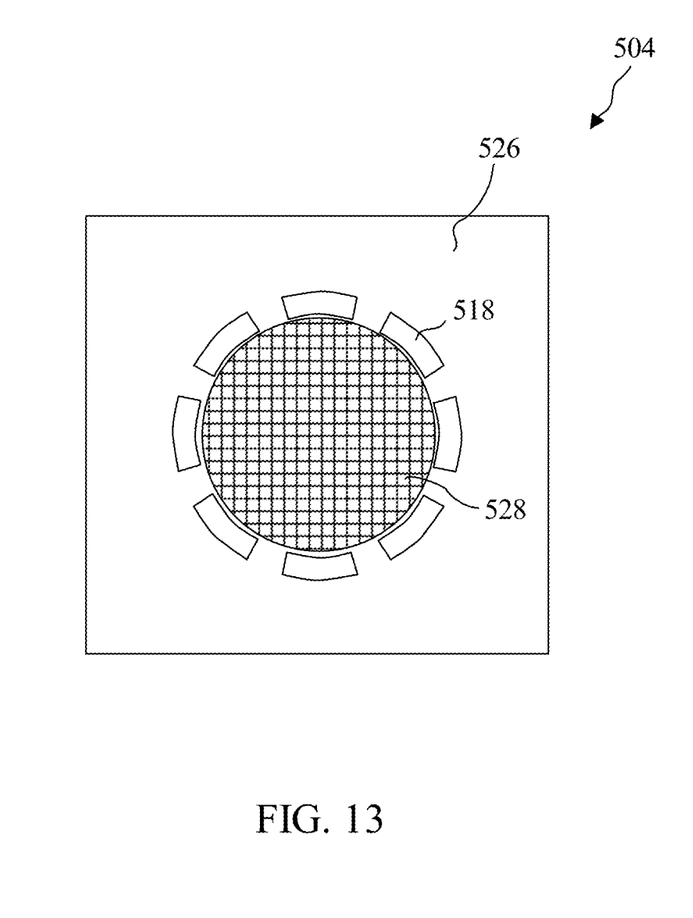
FIG. 13 to FIG. 15 are diagrams illustrating a method for manufacturing the touch device of the present invention.
Figure 14:
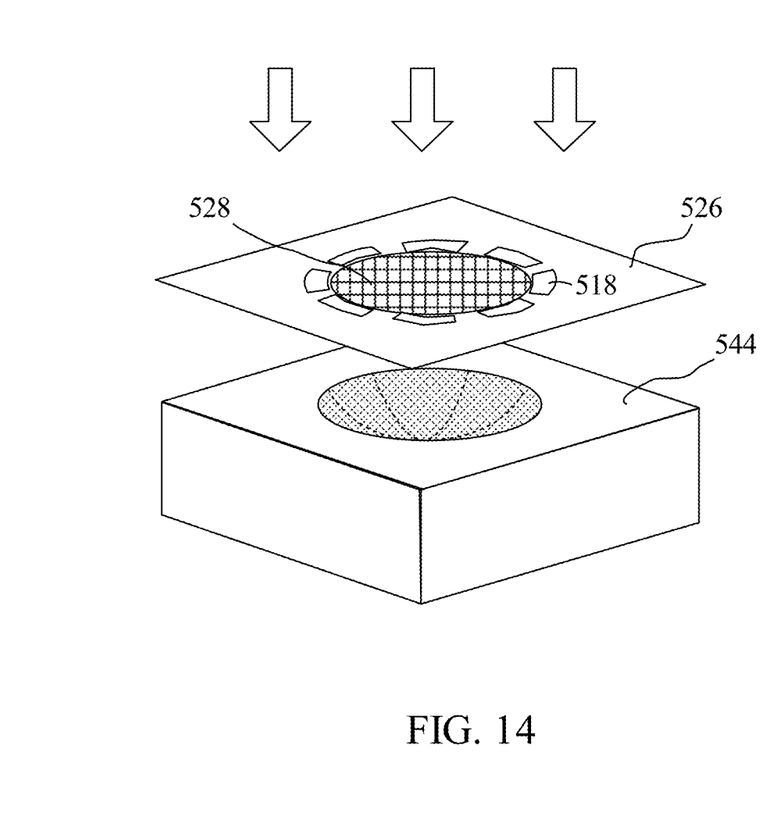
Figure 15:
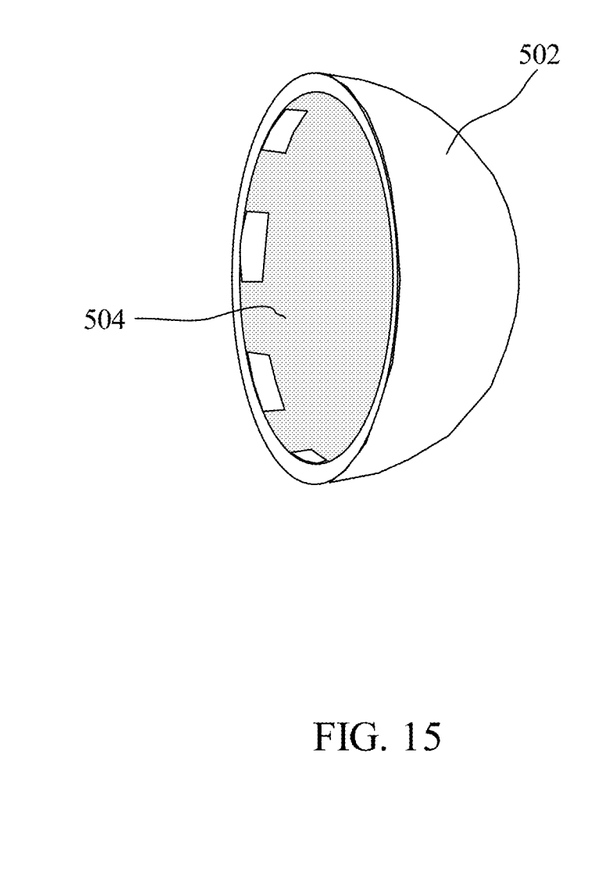

The following describes the method for manufacturing the touch device 500 of the present invention. First, the metal pads 518 and the sensing layer 528 are formed on the substrate 526 to construct the touch sensor 504 as shown in FIG. 13, and the sensing layer 528 is connected to the metal pads 518. After the touch sensor 504 is constructed, the touch sensor 504 is placed in a mold 544 for thermoforming, as shown in FIG. 14. The touch sensor 504 is formed into a three-dimensional touch sensor after thermoforming, and the metal pads 518 are on the inner side of the three-dimensional touch sensor 504. Next, a three-dimensional housing 502 is formed on the outside of the three-dimensional touch sensor 504 by injection molding, as shown in FIG. 15. After forming the housing 502 on the outside of the touch sensor 504, the housing 502 can be appropriately trimmed by the shaping step to obtain the desired shape, such as a housing with a spherical surface, a housing with a non-spherical surface, a regularly shaped housing, or an irregularly shaped housing. After the housing 502 is completed, the lower cover 506, the circuit board 508, the display 512, the retaining frame 514 and the connector 516 shown in FIG. 7 are assembled with the housing 502 and the touch sensor 504 to obtain the touch device 500, as shown in FIG. 6. Specifically, after the display 512 is attached to the retaining frame 514 or embedded in a slot of the retaining frame 514, the retaining frame 514 may be used to fix the connector 516 to the inner side of the touch sensor 504, and the connector 516 may be connected to the metal pads 518. Then, the metal pads 510 on the circuit board 508 are connected to the connector 516, so that the metal pads 510 are electrically connected to the metal pads 518 respectively. Finally, the lower cover 506 is combined with the housing 502 to complete the touch device 500.

What described above is merely embodiments of the present invention, rather than limitations of the invention in any aspect. Although the present invention has been disclosed by the above embodiments, those embodiments are not meant to limit the scope of the present invention. One skilled in the art is readily to understand that how to slightly change or modify the abovementioned technical disclosures, without departing from the technical solutions of the present invention, to form equivalent embodiments. However, any simple equivalent modifications to the above embodiments without substantially departing from the technical solutions of the present invention shall still be within the scope of the present invention. The drawings of the present invention do not contain any limitation on size, dimension and scale. In other words, the size, dimension, shape and scale in actual implementation of the present invention are not limited by the drawings of the present invention.

What is claimed is:

1. A touch device, comprising:
   a housing, having an inner space and an opening, wherein the opening is connected to the inner space;
   a touch sensor, arranged in the inner space and comprising:
      a substrate, arranged in the inner space and corresponding to the shape of the housing; and
      a plurality of first metal pads, arranged on the substrate; and
      a sensing layer, arranged on the substrate and electrically connected to the plurality of first metal pads; and
   a circuit board, arranged on the housing at a position adjacent to the opening, wherein the circuit board has a plurality of second metal pads facing towards the inner space and electrically connected to the plurality of first metal pads, respectively.

2. The touch device of claim 1, further comprising a connector that connects the plurality of first metal pads and the plurality of second metal pads.

3. The touch device of claim 2, wherein the connector comprises a plurality of conductive silicone strips and a plurality of insulating silicone strips, and the plurality of conductive silicone strips are arranged interspersed with the plurality of insulating silicone strips.

4. The touch device of claim 3, wherein said each first metal pad or said each second metal pad is connected to at least three of the conductive silicone strips.

5. The touch device of claim 2, further comprising a retaining frame that fixes the connector to the inner side of the housing, wherein the connector is clamped between the retaining frame and the housing.

6. The touch device of claim 5, further comprising a display arranged on the retaining frame or embedded in a slot of the retaining frame.

7. The touch device of claim 1, further comprising a lower cover connected to the housing and covering the opening, wherein the circuit board is fixed to the lower cover.

8. The touch device of claim 1, wherein the sensing layer comprises a transparent conductive film which has a plurality of transparent conductive wires connected to the plurality of first metal pads.

9. The touch device of claim 8, wherein the plurality of transparent wires are made of poly3,4-ethylenedioxythiophene or cubic boron nitride.

10. The touch device of claim 1, wherein the sensing layer comprises:
   a first transparent conductive film, having a plurality of first transparent conductive wires connected to a portion of the plurality of first metal pads;
   a second transparent conductive film, having a plurality of second transparent conductive wires connected to the remaining portions of the plurality of first metal pads; and
   an insulating layer, located between the first transparent conductive film and the second transparent conductive film.

11. The touch device of claim 10, wherein the plurality of first transparent wires and the plurality of second transparent wires are made of poly3,4-ethylenedioxythiophene or cubic boron nitride.

12. The touch device of claim 10, wherein the insulating layer is an optical adhesive.

13. The touch device of claim 1, wherein the substrate is made of polycarbonate or polymethyl methacrylate.

14. A method for manufacturing a touch device, comprising the following steps:
   forming a plurality of first metal pads and a sensing layer on a substrate to produce a touch sensor, wherein the sensing layer is connected to the plurality of first metal pads;
   placing the touch sensor into a mold for thermoforming, in order to produce a three-dimensional (3D) touch sensor, wherein the plurality of first metal pads are located on the inner side of the three-dimensional touch sensor;
   forming a three-dimensional housing on the outer side of the three-dimensional touch sensor by injection molding; and
   electrically connected to a plurality of second metal pads of a circuit board to the plurality of first metal pads, respectively.

15. The method of claim 14, wherein the step of electrically connected to the plurality of second metal pads to the plurality of first metal pads respectively comprises using a connector to connect the plurality of first metal pads and the plurality of second metal pads.

16. The method of claim 15, wherein the connector comprises a plurality of conductive silicone strips and a plurality of insulating silicone strips, and the plurality of conductive silicone strips are arranged interspersed with the plurality of insulating silicone strips.

17. The method of claim 16, further comprising arranging said each first metal pad or said each second metal pad to connect to at least three of the conductive silicone strips.

18. The method of claim 15, further comprising using a retaining frame to fix the connector to the inner side of the three-dimensional touch sensor, wherein the connector is connected to the plurality of first metal pads.

19. The method of claim 18, further comprising arranging a display on the retaining frame or embedding the display in a slot of the retaining frame.

20. The method of claim 14, further comprising combining a cover and the housing together.

21. The method of claim 14, wherein the step of forming the sensing layer comprises forming a transparent conductive film which has a plurality of transparent conductive wires connected to the plurality of first metal pads.

22. The method of claim 21, further comprising forming the plurality of transparent conductive wires by using poly3,4-ethylenedioxythiophene or cubic boron nitride.

23. The method of claim 14, wherein the step of forming the sensing layer comprises:
   forming a first transparent conductive film, wherein the first transparent conductive film has a plurality of first transparent conductive wires connected to a portion of the plurality of first metal pads;
   forming an insulating layer on the first transparent conductive film; and
   forming a second transparent conductive film on the insulating layer, wherein the second transparent conductive film has a plurality of second transparent conductive wires connected to the remaining portions of the plurality of first metal pads, and the insulating layer is between the first transparent conductive film and the second transparent conductive film.

24. The method of claim 23, further comprising forming the plurality of first transparent conductive wires and the plurality of second transparent conductive wires by using poly3,4-ethylenedioxythiophene or cubic boron nitride.

25. The method of claim 23, wherein the step of forming the insulating layer comprises forming the insulating layer by using an optical adhesive.

26. The method of claim 14, further comprising forming the substrate by using polycarbonate or polymethyl methacrylate.

\* \* \* \* \*